May 11, 1965
W. STELZER
3,182,760
VEHICLE BRAKE DEVICE
Filed Aug. 23, 1962
2 Sheets-Sheet 1
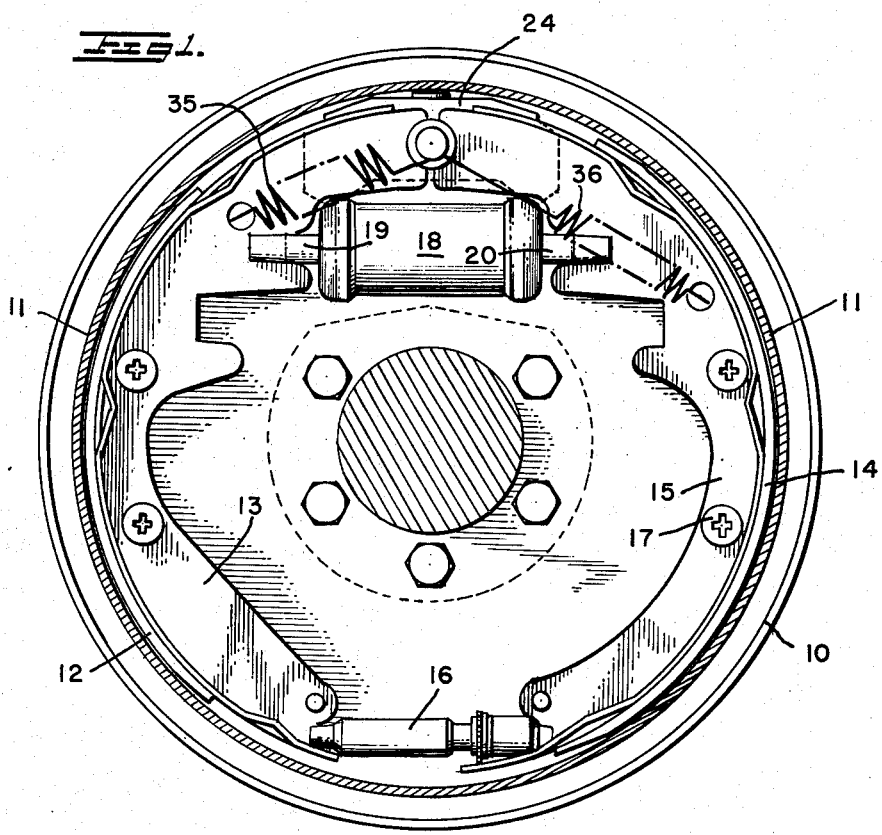
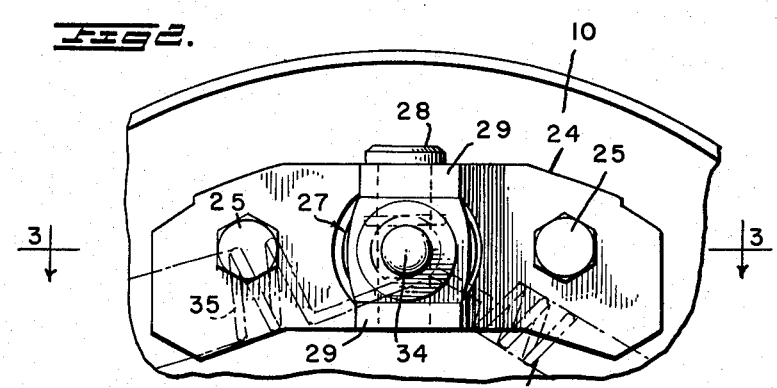
INVENTOR
WILLIAM STELZER
BY *John F. Phillips*
ATTORNEY May 11, 1965     W. STELZER     3,182,760
VEHICLE BRAKE DEVICE
Filed Aug. 23, 1962                           2 Sheets-Sheet 2
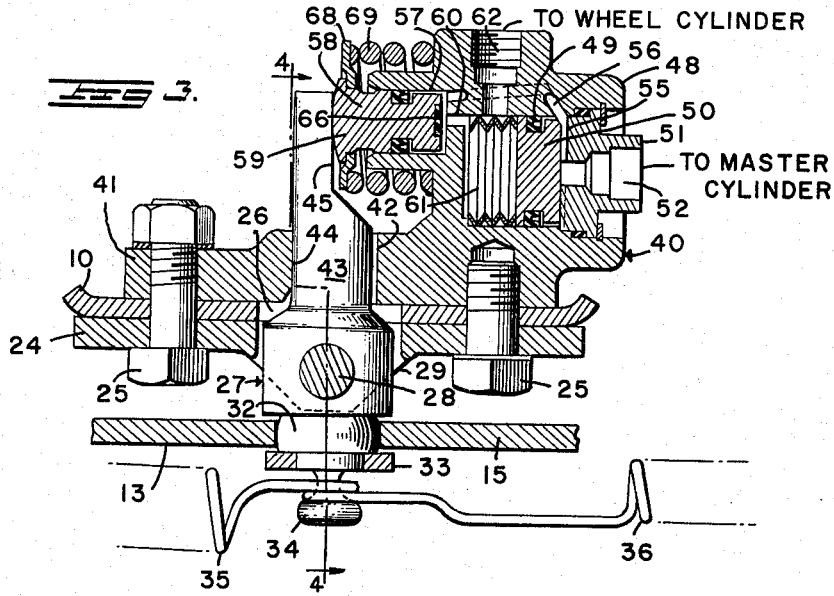
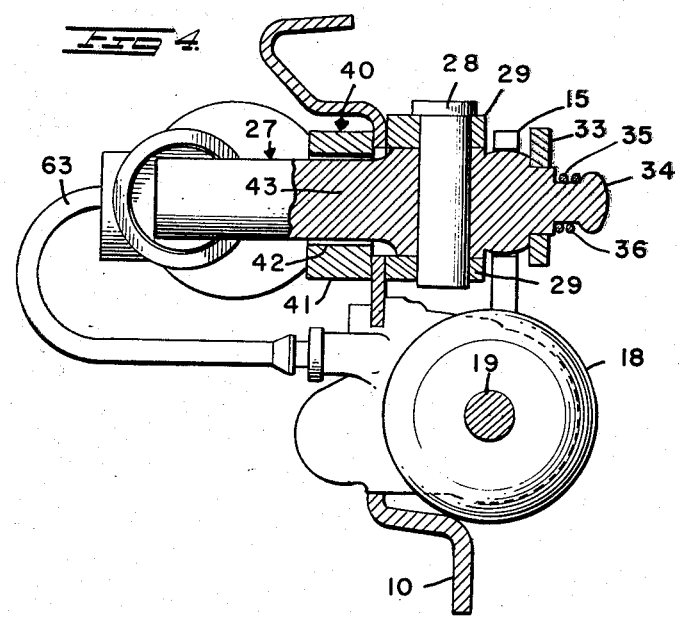
INVENTOR
WILLIAM STELZER
BY *John F. Phillips*
ATTORNEY > 3,182,760
> VEHICLE BRAKE DEVICE
> William Stelzer, Bloomfield Hills, Mich., assignor to
> Kelsey-Hayes Company, Romulus, Mich., a corporation of Delaware
> Filed Aug. 23, 1962, Ser. No. 218,938
> 3 Claims. (Cl. 188—152)

This invention relates to a rear vehicle brake device and more particularly to a device to be added to the rear brakes to effect weight transfer brake compensation as well as better equalization between the right and left rear brakes.

An important object of the invention is to provide a compensating device in which the conventional brake mechanism is left intact except that the anchor is made movable to effect the operation of a novel mechanism which in turn reduces the rate of pressure increase in the rear wheel cylinders relative to that transmitted to the front wheel cylinders.

A further object is to provide a mechanism in which there is a normal path for conveying brake fluid from the master cylinder to each rear wheel cylinder, and in which, upon the operation of the associated brake to a predetermined extent proportional to the weight transfer of the vehicle body forwardly, such path of fluid flow is disturbed, after which the rate of flow of fluid to the wheel cylinder is substantially reduced to provide a rate of increase in rear braking substantially below the rate of increase in the forwarding wheel braking, thus tending to maintain the traction of the rear wheels and minimizing the chance that the rear wheels may lock and slide.

A further object is to provide a brake mechanism of the character referred to wherein a novel valve, responsive to vehicle braking closes the normal path of fluid flow to the rear wheel cylinder, after which another device comes into operation to force fluid at a much lower rate into the associated wheel cylinder, thus decreasing the rate of increase in pressure in the rear wheel cylinder.

Other objects and advantages of the invention will become apparent during the course of the following description.

In the drawings I have shown one embodiment of the invention. In this showing:

FIGURE 1 is a face view showing the left rear brake mechanism of a motor vehicle, it being understood that the right wheel mechanism is identical, but reversed, FIGURE 2 is an enlarged fragmentary face view showing the brake anchor pin and associated elements, parts being omitted, FIGURE 3 is a fragmentary sectional view on line 3—3 of FIGURE 2, and FIGURE 4 is a sectional view on line 4—4 of FIGURE 3.

Referring to FIGURE 1, there is illustrated most of the parts of a conventional left rear brake mechanism, including the usual backing plate 10, a brake drum 11, a primary brake shoe 12 and its web 13, and a secondary brake shoe 14 together with its web 15. The brake shoes are connected at the bottom by a conventional connecting and adjusting means 16. The web of the brake shoes are supported in the usual manner as at 17 with respect to the backing plate 10. The brake mechanism further includes a conventional wheel cylinder 18 having the usual pistons (not shown) provided with operating rods 19 and 20 engageable respectively with the brake shoe webs 13 and 15.

An anchor plate 24 is fixed at 25 (FIGURE 3) to the backing plate 10, and the two plates 10 and 24 are provided with an opening 26, through which projects an anchor pin 27. Conventionally this anchor pin is stationary, but in accordance with the present invention the anchor pin is provided with a pin 28 by which it is pivoted to ears 29, carried by the anchor plate 24. The anchor pin 27 is provided with a portion 32 between the adjacent ends of the brake shoe webs 13 and 15 and engaged thereby. A washer 33 on the anchor pin prevents displacement of the parts, and an axial projection 34 on the anchor pin is connected to the inner ends of springs 35 and 36, having the other ends connected to the respective brake shoe webs 13 and 15, thus urging the free ends of the brake shoes toward each other.

A preferably cast body 40 (FIGURE 3) is secured in position against the backing plate by the elements 25 and includes a flat portion 41 seating against such plate. Such flat portion of the casting 40 is provided therethrough with an opening 42 through which the adjacent portion 43 of the anchor pin projects. Such portion of the anchor pin is of smaller diameter than the opening 42, and normally bears against one side thereof as of 44. The extremity of the anchor pin is reduced and flattened as of 45 for a purpose to be described.

The casting 40 includes a housing 48, having a bore 49 therein, in which is arranged in sealed slidable engagement therewith a piston 50 normally in engagement with a plug 51 sealed in the larger outer end of the bore and provided with a port 52, communicating through a suitable pipe line with the master cylinder of the vehicle.

The inner end of the plug 51 is grooved as at 55 to connect the port 52 to one end of a passageway 56 formed in the housing 48 and communicating at its other end with the inner end of a bore 57, in which is arranged a plunger 58, having a head 59 engaging the flat side 45 of the anchor pin. The inner end of the bore 57 communicates through a port 60 with the adjacent end of the bore 49, and in such end of the latter bore is arranged a plurality of Belleville springs 61. Such end of the bore 49 also opens through a port 62 to one end of a line 63 (FIGURE 4) having its other end connected to the wheel cylinder.

Under conditions to be described, the plunger 58 is movable to the right in FIGURE 3 to close the port 60, and to this end the plunger 58 is provided with a valve 66. To bias the plunger 58 to its normal position with the valve 66 open and with the anchor pin portion 43 engaging the side 44 of the opening 42, the plunger head 59 is provided with a washer 68 engaged by a spring 69. The loading of the spring determines the force which must be applied to the plunger 58 to close the valve 66.

*Operation*

The parts normally occupy the positions shown in the drawings. When the brake pedal is operated, hydraulic fluid is displaced from the master cylinder (not shown) to all of the wheel cylinders of the vehicle, including the rear wheel cylinder illustrated. Referring to FIGURE 3, master cylinder pressure flows through the port 52 and through passage 56 to the bore 57, thence through port 60 (the valve 66 being normally open) and from the left hand end of the bore 49, through port 62 and line 63 (FIGURE 4) to the wheel cylinder 18. The pistons of the wheel cylinder then operate to move the brake shoes apart, and the friction of the lining 12 against the brake drum tends to swing the brake shoes and the end of the web 15 (FIGURE 3) of the secondary shoe bears against the anchor pin portion 32 to cause the anchor pin to tend to swing above its pivot 28. Thus the flat face 45 of the anchor pin is caused to exert a force against the plunger head 59.

The plunger 58 is of such diameter that, in view of the ratio of the lever arms of the anchor pin, it cancels out the applying force of the wheel cylinder piston so that the spring 69 merely opposes the brake torque. The brake torque effective against the plunger 58, therefore, is proportional to the weight transfer of the vehicle body under braking conditions. At a predetermined brake torque depending upon the loading of the spring 69, the plunger 58 will move against the loading of said spring and the valve 66 will close the port 60, thus preventing the direct flow of master cylinder fluid from the port 52 to the wheel cylinder 18. The building up of pressure from the master cylinder under such conditions moves the piston 50 to the left against the resistance of the Belleville springs 61. Thus the chamber to the left of the piston 50 will be reduced in volume and some fluid will be displaced through port 62 to the wheel cylinder 18. This flow of fluid is substantially less than the rate of flow when the port 60 is open. The building up of pressure beyond the point at which the valve 66 closes, therefore, is at a rate substantially lower than the pressure build-up in the front wheel cylinders. Thus maximum total braking may be effective with a greatly minimized chance that the rear wheels of the vehicle will lock and slide. In the present brake systems, the rear wheels can be very easily locked and the sliding of the wheels over the highway provides much lower braking than when rear wheel traction is maintained. The present mechanism therefore, is highly advantageous over present systems.

Obviously, when the brake pedal is released, the force exerted against the anchor pin portion 32 is relieved and the spring 69 moves the plunger 58 to open the valve 66 and move the pivot pin into engagement with the left side (FIGURE 3) of the opening 42 as at 44. This contact limits movement of the plunger 58 and expansion of the spring 69, as is obvious. The springs 35 and 36 return the brake shoes to normal position, displacing fluid from the wheel cylinder 18 through line 63 and back through the various ports, chambers and passages described to the vehicle master cylinder. All of the parts then will be arranged in the positions shown in the drawings.

The engagement of the anchor pin portion at 44 with the opening 42 permits the spring 69 to be preloaded to yield when the retarding force at the wheel on the road surface is approximately (for example) .3W, where W is the weight on the wheel.

As previously stated, certain parts of the brake mechanism which form no part of the present invention, have been omitted, for example, the parking brake and the automatic adjuster, where such device is employed. Since the present device is applicable to conventional brake designs, and the geometry of the brake is not changed, the braking in reverse is not changed and the parking brake mechanism is not affected.

It is to be understood that the form in the invention shown and described is to be taken as a preferred example of the same and that various changes in the shape, size and arrangement of parts may be made as do not depart from the spirit of the invention or the scope of the appended claims.

I claim:

1. In a brake device for a vehicle wheel having a backing plate and brake shoes and a wheel cylinder for expanding said shoes and provided with a source of hydraulic fluid, and a control device carried by the backing plate and comprising passage means between said source and said wheel cylinder and comprising a first chamber communicating with said source and a second chamber communicating with said wheel cylinder and provided with a port therebetween, an axially movable member in said first chamber provided with a valve movable to close said port, said valve being normally open to provide normal communication through said passage means, means responsive to a predetermined brake torque for closing said valve, such means comprising a rocking member connected with the brake shoes and engaging said axially movable member, said rocking member having a normal position when said brake shoes are released, and from which position it is movable by brake torque to close said valve, and a spring biasing said axially movable member to normal position to predetermine the brake torque at which said rocking member will close said valve, and means responsive to pressure in said source, if said valve is closed, for reducing the volume of said second chamber to displace fluid therefrom to said wheel cylinder at a rate lower than the normal rate of flow of fluid through said passage means.

2. In a brake device for a vehicle wheel having a backing plate and brake shoes and a wheel cylinder for expanding said shoes and provided with a source of hydraulic fluid, and a control device carried by the backing plate and comprising passage means between said source and said wheel cylinder and comprising a first chamber communicating with said source and a second chamber communicating with said wheel cylinder and provided with a port therebetween, an axially movable member in said first chamber provided with a valve movable to close said port, said valve being normally open to provide normal communication through said passage means, means responsive to a predetermined brake torque for moving said axially movable member to close said valve, a spring biasing said axially movable member to a normal position to predetermine the brake torque at which said torque-responsive means will move said axially movable member to close said valve, said torque-responsive means comprising a rocking member engaging said brake shoes and said axially movable member and having means limiting its movement to a normal position, to which position it is biased by said spring, a pressure responsive member arranged between said second chamber and said source and movable by a pressure in said source to reduce the volume of said second chamber to displace fluid therefrom to said wheel cylinder, and means for resisting such movement of said pressure responsive member to determine the rate of flow of fluid from said second chamber to said wheel cylinder when said pressure responsive member is subjected to a given pressure in said source.

3. A brake device according to claim 2 wherein said brake shoes are of the self-energizing type, said rocking member comprising an anchor pin pivoted between said brake shoes and said axially movable member, swinging movement of said brake shoes around the axis of the vehicle wheel when said brake shoes develop a predetermined torque, swinging said anchor pin about its pivot to effect movement of the said axially movable member to close said valve.

References Cited by the Examiner
UNITED STATES PATENTS

| | | | |
|---|---|---|---|
| 2,903,100 | 9/59 | Freeman | 303—24 |
| 2,999,567 | 9/61 | Adams | 303—24 |
| 3,047,099 | 7/62 | Dahle | 188—78.35 |
| 3,087,761 | 4/63 | Stelzer | 303—24 |

ARTHUR L. LA POINT, *Primary Examiner.*
EUGENE G. BOTZ, *Examiner.*